United States Patent

[11] 3,578,748

| [72] | Inventor | Raymond M. Hurd |
| | | 2548 S. 78th St., Milwaukee, Wis. 53219 |
| [21] | Appl. No. | 798,396 |
| [22] | Filed | Feb. 11, 1969 |
| [45] | Patented | May 18, 1971 |

[54] ICE FISHING HOLE COVER
7 Claims, 5 Drawing Figs.

[52] U.S. Cl. ................................................ 43/44.9, 43/17
[51] Int. Cl. ....................................... A01k 93/00, A01k 97/12
[50] Field of Search ................................ 43/17, 4, 44.9, 44.91, 3, 1

[56] References Cited
UNITED STATES PATENTS

| 2,572,340 | 10/1951 | Hockenhull | 43/44.9 |
| 2,611,211 | 9/1952 | Stockton | 43/44.91 |
| 2,733,532 | 2/1956 | Siegel | 43/17 |
| 2,779,122 | 1/1957 | DeGroff | 43/17X |
| 3,029,541 | 4/1962 | Palmer | 43/3 |
| 3,134,188 | 5/1964 | Petersen | 43/17 |

*Primary Examiner*—Warner H. Camp
*Attorney*—Andrus, Sceales, Starke & Sawall

ABSTRACT: A buoyant cover for an ice fishing hole is formed as a centrally split, two-piece plate member having recesses defining a fishing line opening. The opposed edges of the pieces are releasably connected by an adhesive greaselike substance. The plate member is covered with a water-repellent material and has a black coating on its top surface to absorb heat.

PATENTED MAY 18 1971  3,578,748

Inventor
Raymond M. Hurd
By
Andrus, Sceales, Starke & Sawall
Attorneys

ICE FISHING HOLE COVER

This invention relates to an ice fishing hole cover and particularly to a cover member which is adapted to maintain the opening or hole in the ice in an open condition.

In the sport of ice fishing, an opening or hole is drilled or otherwise formed in the ice to permit access to the water. In relatively cold weather, the opening has a tendency to freeze over; particularly where a plurality of holes are provided and any given hole may be unattended for a relatively long period of time. Although various hole plugs and cover devices have been suggested, they have generally provided covers resting directly on the adjacent ice and overlying of the top of the hole. Some devices project from the top of the ice onto the hole and water. Such cover devices may require relatively smooth characteristics of ice adjacent the hole, are subject to movement by accidental engagement or the like, and have not been completely satisfactory or widely employed.

The present invention is particularly directed to a relatively simple and inexpensive cover which prevents freezing over of the opening over relatively long periods.

Generally, in accordance with the present invention, the ice cover is a padlike element of a rigid or semirigid and self-supporting material which floats on the water within the hole. The cover is preferably formed of a rigid foam plastic, such as styrofoam or other suitable insulating material having a density substantially less than water. A cover of foam material can be provided in certain basic sizes conforming to the usual ice fishing hole, but readily modified to accommodate smaller variations. The material, such as styrofoam, is preferably covered with a water-repellent material to minimize freezing of water to the cover. The water-repellent material will also protect the fisherman's hands when inserting and removing the cover. Further, surface tension is thereby increased and the cover floats on a hill-like portion of water within the hole to essentially eliminate the contact of the cover sidewalls with the water. It, however, maintains the floating engagement and substantial coverage of the opening, which in turn confines the position of the cover. The cover can be provided with black coating on the top surface to increase heat absorption and thereby further prevent freezing of the water under the cover.

The floating pad member of the present invention eliminates the problem of a top, rough surface while maintaining an effective cover. Further, when fishing a jig pole and the like, the cover will also act as a bobber, preventing the danger of the fish running away with the jig pole assembly.

In a particularly novel and important aspect of the present invention, the cover is formed as a centrally split, two-piece element having central recesses defining he fishing line opening. The split elements may be conveniently assembled about a tip-up unit or the like and interconnected to form the cover. The two separate elements also permit more convenient carrying and handling of the cover. The opposed edges of the cover elements are preferably provided with a suitable releasable adhesive to releasably hold the elements in assembled relationship in actual use, but permitting relatively simple separation of the parts when disassembling the cover. the edges may be connected by a grease- or salvelike material which may also advantageously be coated with an oillike material to minimize excessive setting of the adhesive and assisting in the removal or separation of the elements.

In another aspect of the present invention, a liner may be provided in the central opening to prevent the line of a jig pole assembly from entering the joint between the cover elements. The top edge of the central opening may also be beveled such that the float element is more readily viewed from any position adjacent the hole.

The drawing furnished herewith illustrates the best mode presently contemplated by the inventor for carrying out the subject invention and clearly discloses the above advantages and features as well as other which will be readily understood from the following description.

Figure 1:
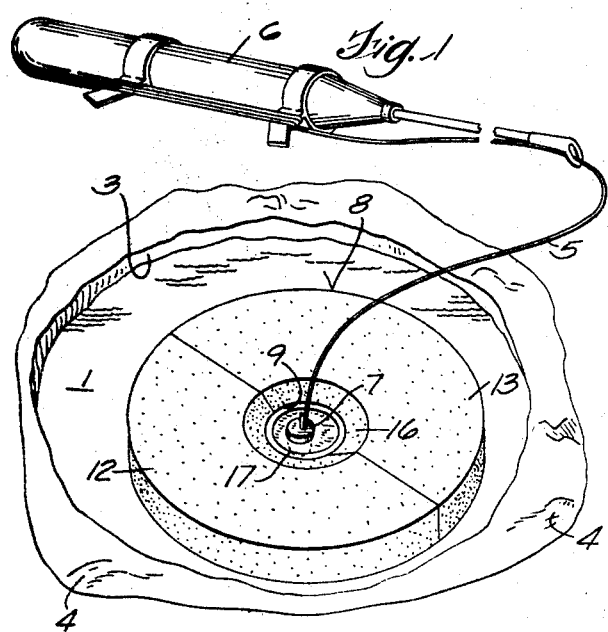
FIG. 1 is a pictorial view illustrating the present invention with an ice fishing jig pole assembly.
Figure 3:
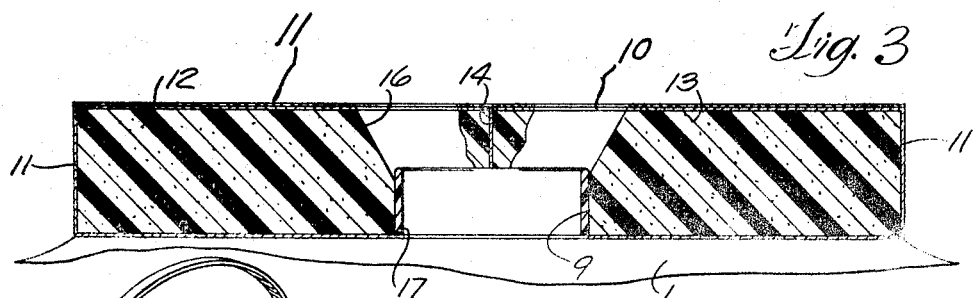
FIG. 3 is an enlarged sectional view taken on line 3—3 of FIG. 2 and showing the ice cover setting on the water.

Referring to the drawings and particularly to FIGS. 1 and 3, a body of water 1 is shown generally covered with ice 2. An opening or hole 3 is provided in the ice 2 to permit access to the water 1 for purposes of fishing.

As diagrammatically shown, the ice immediately adjacent the opening may be of a rough, chipped ice and frozen snow characteristic, as shown by the numeral 4. A fishing line 5 extends from a jig pole 6 into the water 1 through the opening 3. A float 7 is secured to and supports the line 5 with a selected portion of the line extending into the water, the lower end terminating in a hook, not shown.

In accordance with the present invention, the opening 3 is substantially covered by an ice hole cover 8 which particularly forms the subject matter of the present invention. The illustrated cover 8 is generally a flat disclike pad member which floats directly on the body of water 1 within the hole 3 and substantially covers the opening 3. The disclike pad member includes a central opening 9 within which the float 7 rests on the water 1. The opening is generally only slightly larger than the size of the float 7 to minimize the exposed water.

More particularly, the cover 8 in the illustrated embodiment of the invention is formed of an insulating material having a density substantially less than that of water. For example, applicant has found that a rigid foam plastic, such as styrofoam and the like produces unusually satisfactory results. Such material is readily formed and functions in an unusually satisfactory manner to maintain coverage of the hole or opening 3 without freezing of the cover to the water.

The upper surface of the insulating cover 8 is advantageously formed with a black coating 10 to increase the thermal or heat absorption and thereby further minimize possible freezing of water under the cover.

The cover 8 in accordance with another feature of this invention, is provided with a filmlike coating 11 of a water-repellent material of a heavy greaselike consistency to minimize the entrance of water into the pores of the styrofoam or other similar material and to thereby minimize the danger of freezing. The cover 8 of styrofoam or other similar material of a very minimal density rests on the top of the water 1 and as a result of surface tension, and particularly with a repellent coating, actually rests on a hill or moundlike portion of water within the opening 3 without the cover sidewalls projecting into the water; for example, as diagrammatically shown in FIG. 3. The water repellent material 11 further minimizes the danger of any freezing of the cover 8 to the hands of the fisherman while inserting and removing the cover from water 1.

Figure 2:
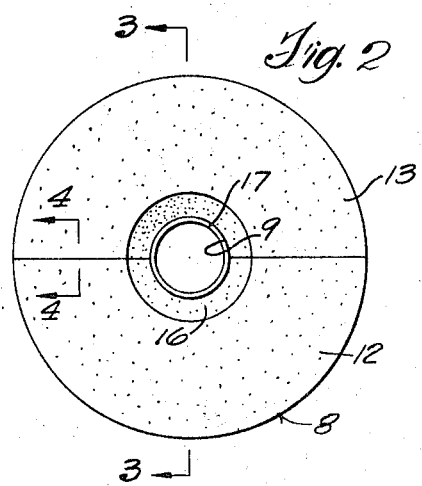
FIG. 2 is an enlarged top elevational view of the ice hole cover assembly constructed as shown in FIG. 1 with the jig pole assembly removed.
Figure 5:
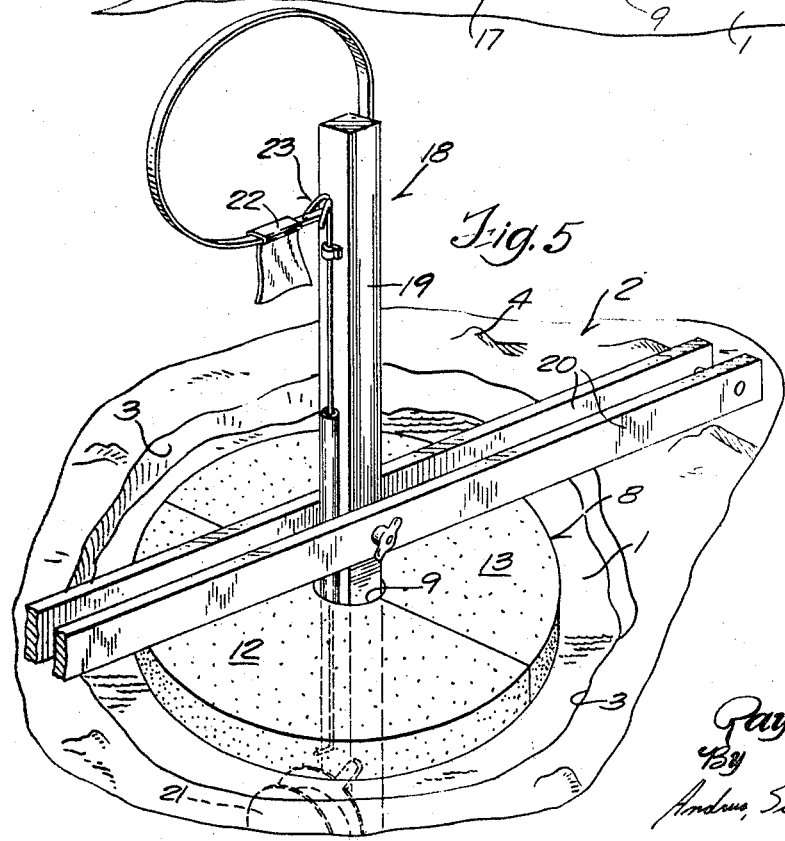
FIG. 5 is a pictorial view similar to FIG. 1 illustrating the invention applied to an ice fishing tip-up gear assembly.
Figure 4:
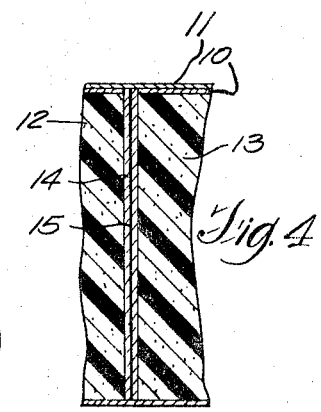
FIG. 4 is an enlarged vertical section taken generally on line 4—4 of FIG. 2 and more clearly illustrating the interconnection of a pair of members forming the ice hole cover.

In the preferred construction, as shown in FIGS. 1 through 3, the cover is formed as a centrally split member defining corresponding semicircular elements 12 and 13 having mating recesses defining the opening 9. The split construction permits more convenient and compact carrying of the device and assembly with a tip-up device, such as shown in FIG. 5. Furthermore, if an element is dropped, the flat edge defined by the split prevents rolling on the ice 2, or the like.

The two halves are interconnected to each other in any suitable manner. IN a novel aspect of the present invention, the cover portions are interconnected by a suitable adhesive 14, such as a greaselike or salvelike material similar to the water repellent coating of the cover. The adhesive 14 is applied to one or both edges before joining them in mating relation. The adhesive 14 firmly holds the cover elements 12 and 13 together while permitting relatively simple, subsequent separation.

Applicant has also found that coating of the greased edges with an oil 15, such as a mineral oil, olive oil or the like may be desirable in very cold weather. It does not in any way interfere with the effective interconnecting characteristic, but does permit more convenient separation of the two halves. Thus, without the oil or the like, there may be a tendency for the adhesive to set and tend to form a solid bond between the two covers with the resulting tearing of the cover material if forced separation is established. The oil 15, or the like, particularly permits sliding of the elements 12 and 13 longitudinally of the joint with a resulting clean separation.

The central opening 9 of cover 8, as shown in FIGS. 1 through 4 for jig pole fishing, is provided with a beveled upper edge 16. This is desirable to permit a more convenient viewing of the position of the float 7.

Furthermore, applicant has found that it is desirable to provide a small plastic ringlike liner or bushing 17 about the inner opening 9. The inner ring is formed of vinyl or other similar relatively smooth plastic material which will essentially reject or prevent freezing of the water to it and which will float and readily stay in place. The bushing 17 positively prevents the fishing line 5 from moving into the joint between the cover halves. The fishing line 5 is shown substantially thicker than the usual hairlike line which is actually employed and which might quite readily enter the split in the cover.

In the operation of the device, the cover 8 may also act as a bobber such that if a fish should tend to run with the line 5, the jig pole 6, in moving into the opening, engages the cover 8 which will further oppose the force exerted by the fish.

Applicant has found that the cover 8, constructed in accordance with the present invention and particularly as shown in the preferred construction of FIGS. 1 through 4, prevents freezeover of the opening 3 and permits ready removal and insertion of the cover unit.

The present invention can also be employed with a tip-up fishing apparatus, for example, as shown in FIG. 5. Generally, the corresponding elements in FIGS. 1 and 5 are similarly numbered for simplicity and clarity of explanation.

In FIG. 5, a tip-up device 18 is diagrammatically shown of a well-known structure and includes a support pole 19 extending vertically through the opening 9 with lateral cross braces 20 secured to an intermediate portion of the pole 19 by a suitable pivot pin unit. Braces 20 extend laterally in diagrammatically opposite directions onto the ice 2 immediately adjacent the fishing hole 3. The support pole 19 extends downwardly into the water 1 with a reel 21 secured to the lower end. A leaf spring flag unit 22 is secured at one end to the upper end of the pole 19 and releasably held in a first position by a latch 23 coupled to the reel 21. The latch 23 normally holds the leaf spring flat unit 22 which flies up to indicate to the fisherman that a fish is on the line.

The cover 8 essentially corresponds to that shown in FIG. 1 and includes the several parts 12 and 13 interconnected through a suitable releasable grease adhesive or the like. In the embodiment of FIG. 5, the cover 8 includes a single central opening 9 just slightly larger than the pole 19. There is no necessity for the beveled edge 16 or for the central bushing 17 of FIG. 1, as the function performed by the bevel and bushing are not necessary with a tip-up device, as shown in FIG. 5. The split construction is particularly significant with respect to the tip-up type device of FIG. 5, however, as it permits assembly of the cover 8 about the pole 19 with the reel 21 to the bottom side and cross braces 20 to the other side for placement in opening 3 without the necessity of disassembling the elements.

The cover in FIG. 5 operates essentially in the identical manner as the cover of FIG. 1 to provide a means positively preventing freezing over of the opening.

If desired, a suitable cone-shaped cover can be disposed over the opening to minimize the blowing of snow and the like into the opening.

The present invention thus provides a relatively simple and inexpensive cover which can be employed any number of times.

I claim:

1. An ice fishing hole cover for fishing with a hooked line through an ice fishing hole in ice, comprising a cover member including an insulating material having a density substantially less than water whereby the cover member rides on the water within an ice fishing hole, said member being a substantially flat platelike member and having an outer configuration to substantially close the ice fishing hole and a small central opening to freely receive an ice fishing line assembly, said central opening being larger than said line to allow free movement of the line in response to hooking of a fish, said substantially flat platelike member including a pair of similar abutting elements having complementing recesses defining said central opening and a nonsetting releasable adhesive material interposed between said elements and releasably interconnecting said elements to define said member.

2. The ice fishing hole cover of claim 1, wherein said releasable adhesive is a greaselike medium on the opposed mating edges of said elements for releasably connecting said member.

3. The ice fishing hole cover of claim 1, having a water-repellent coating covering said member.

4. The ice fishing hole cover of claim 1, having a black coating on the top surface to absorb heat from the surrounding atmosphere.

5. The ice fishing hole cover of claim 1, wherein said adhesive is a heavy greaselike material on the opposed mating edges of said elements releasably connecting said elements, a release material coating said heavy greaselike material to prevent setting of the material to a solid mass, and a water-repellent coating on the exterior surfaces of said elements.

6. The ice fishing hole cover of claim 1, wherein said platelike member is a flat disc configuration including a pair of similar semicircular elements having opposed recesses defining the central opening, said members being formed of styrofoam, said releasable adhesive is a greaselike adhesive on the opposed mating edges of said semicircular members for releasably connecting said members, a water-repellent oil coating said semicircular members, and the upper surface of said members being black to absorb heat energy from the surrounding atmosphere.

7. The ice fishing hole cover of claim 1, wherein a ring member is located within said central opening to bridge the mating edges and prevent a fishing line passing through the opening from entering between said edges.